US012353641B2

(12) United States Patent
Mori et al.

(10) Patent No.: US 12,353,641 B2
(45) Date of Patent: Jul. 8, 2025

(54) DISPLAY CONTROL SYSTEM, DISPLAY CONTROL METHOD, AND PROGRAM

(71) Applicant: Sony Interactive Entertainment Inc., Tokyo (JP)

(72) Inventors: Hideki Mori, Tokyo (JP); Koichi Shiono, Tokyo (JP); Yoshihisa Takahashi, Tokyo (JP); Hirofumi Kaneko, Tokyo (JP); Hiroya Matsugami, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/693,162

(22) PCT Filed: Oct. 25, 2021

(86) PCT No.: PCT/JP2021/039277
§ 371 (c)(1),
(2) Date: Mar. 19, 2024

(87) PCT Pub. No.: WO2023/073760
PCT Pub. Date: May 4, 2023

(65) Prior Publication Data
US 2024/0402835 A1 Dec. 5, 2024

(51) Int. Cl.
*G06F 3/033* (2013.01)
(52) U.S. Cl.
CPC .................................. *G06F 3/033* (2013.01)
(58) Field of Classification Search
CPC ...................................................... G06F 3/033
See application file for complete search history.

(56) References Cited

U.S. PATENT DOCUMENTS 5,717,423 A * 2/1998 Parker ..................... G06F 3/016
434/114
7,852,333 B2 * 12/2010 Nishikawa ........... H04N 13/388
353/7

(Continued)

FOREIGN PATENT DOCUMENTS

| JP | 2000-066626 A | 3/2000 |
| JP | 2005-038303 A | 2/2005 |
| WO | 2014/061362 A1 | 4/2014 |

OTHER PUBLICATIONS

Matsuda, Translation of JP2000066626, Mar. 3, 2000 (Year: 2000).*

(Continued)

*Primary Examiner* — Dmitriy Bolotin
(74) *Attorney, Agent, or Firm* — Fish & Richardson P.C.

(57) ABSTRACT

Provided is a display control system that can express various display modes. The display control system has a display control section that causes a display object to be displayed, which includes a plurality of elements respectively associated in advance with a plurality of lattice points included in a lattice-shaped operating device, and acquiring means that acquires position coordinates of each of the plurality of lattice points, and the display control section determines a display mode of each of the plurality of elements on the basis of the position coordinates of the plurality of lattice points associated in advance with the plurality of elements, respectively.

19 Claims, 17 Drawing Sheets

(56) References Cited

U.S. PATENT DOCUMENTS

| | | | | |
|---|---|---|---|---|
| 8,508,469 | B1* | 8/2013 | Rosenberg | G01B 21/04 |
| | | | | 345/156 |
| 2001/0038376 | A1* | 11/2001 | Sato | G06F 3/0346 |
| | | | | 345/156 |
| 2002/0105496 | A1* | 8/2002 | Giuliani | G09B 21/003 |
| | | | | 345/156 |
| 2011/0025602 | A1* | 2/2011 | Sivan | G09B 21/003 |
| | | | | 340/407.2 |
| 2012/0026196 | A1* | 2/2012 | Deng | G06F 3/033 |
| | | | | 345/156 |
| 2019/0353975 | A1* | 11/2019 | Didomenico | G02B 3/14 |
| 2022/0038670 | A1* | 2/2022 | Saigo | H04N 9/3147 |
| 2022/0137705 | A1* | 5/2022 | Hashimoto | G06F 3/0486 |
| | | | | 345/156 |
| 2024/0199243 | A1* | 6/2024 | Andreev | G05D 1/104 |

OTHER PUBLICATIONS

International Search Report and Written Opinion mailed on Dec. 14, 2021, received for PCT Application PCT/JP2021/039277, filed on Oct. 25, 2021, 08 pages including English Translation.

\* cited by examiner

F I G. 1
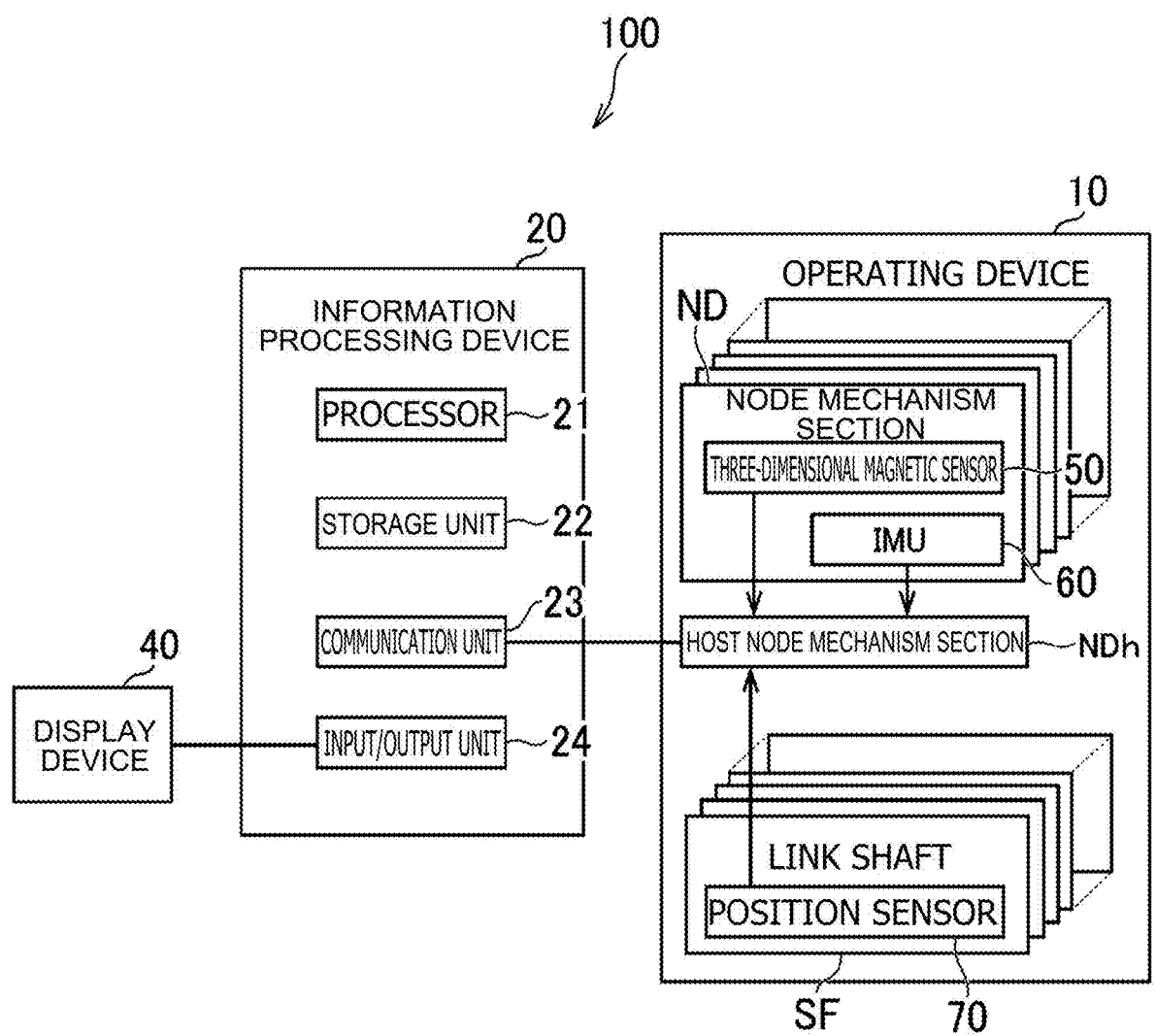

DISPLAY CONTROL SYSTEM, DISPLAY CONTROL METHOD, AND PROGRAM

CROSS-REFERENCE TO RELATED APPLICATION

The present application is based on PCT filing PCT/JP2021/039277, filed Oct. 25, 2021, the entire content of which is incorporated herein by reference.

TECHNICAL FIELD

The present invention relates to a display control system, a display control method, and a program.

BACKGROUND ART

PTL 1 listed below discloses a game device that performs display according to a user's operation of an operation device.

CITATION LIST

Patent Literature

[PTL 1]
PCT Patent Publication No. WO 2014/061362A

SUMMARY

Technical Problem

In recent years, in game devices and the like, it has become possible to express a variety of movements of display objects as the processing capacity of computers has improved. Due to this, there is a need for technology that can express various display modes according to input operations.

The present invention has been made in view of the above problem, and one of its objects is to provide a display control system, a display control method, and a program that can express various display modes.

Solution to Problem

In order to solve the above problem, a display control system according to the present invention has display control means that displays a display object including a plurality of elements that are respectively associated in advance with a plurality of lattice points included in a lattice-shaped operating device, and acquiring means for acquiring the position coordinates of each of the plurality of lattice points, and the display control means determines a display mode of each of the plurality of elements on the basis of the position coordinates of the plurality of lattice points respectively associated in advance with the plurality of elements.

Further, the display control method according to the present invention includes a step of acquiring position coordinates of a plurality of lattice points included in a lattice-shaped operating device, and a step of displaying a display object including a plurality of elements respectively associated in advance with the plurality of lattice points, and in the displaying step, the display mode of each of the plurality of elements is determined on the basis of the position coordinates of the plurality of lattice points that are respectively associated in advance with the plurality of elements.

Still further, the program according to the present invention is a program that causes a computer to execute a step of acquiring the position coordinates of a plurality of lattice points included in a lattice-shaped operating device, a step of displaying a display object including a plurality of elements respectively associated in advance with the plurality of lattice points, and in the displaying step, a display mode of each of the plurality of elements is determined on the basis of the position coordinates of the plurality of lattice points respectively associated in advance with the plurality of elements.

BRIEF DESCRIPTION OF DRAWINGS

FIG. 1 is a diagram illustrating an example of a physical configuration of a display control system according to the present embodiment.

DESCRIPTION OF EMBODIMENTS

An embodiment of the present invention (hereinafter referred to as the present embodiment) will be described below with reference to the drawings. In the following description, the directions indicated by X1 and X2 in FIG. 2, etc. are defined as rightward and leftward directions, respectively, the directions indicated by Y1 and Y2 in the figures are defined as frontward and rearward directions, respectively, and the directions indicated by Z1 and Z2 in the figures are defined as upward and downward directions, respectively.

[Overview of Display Control System]

Figure 2:
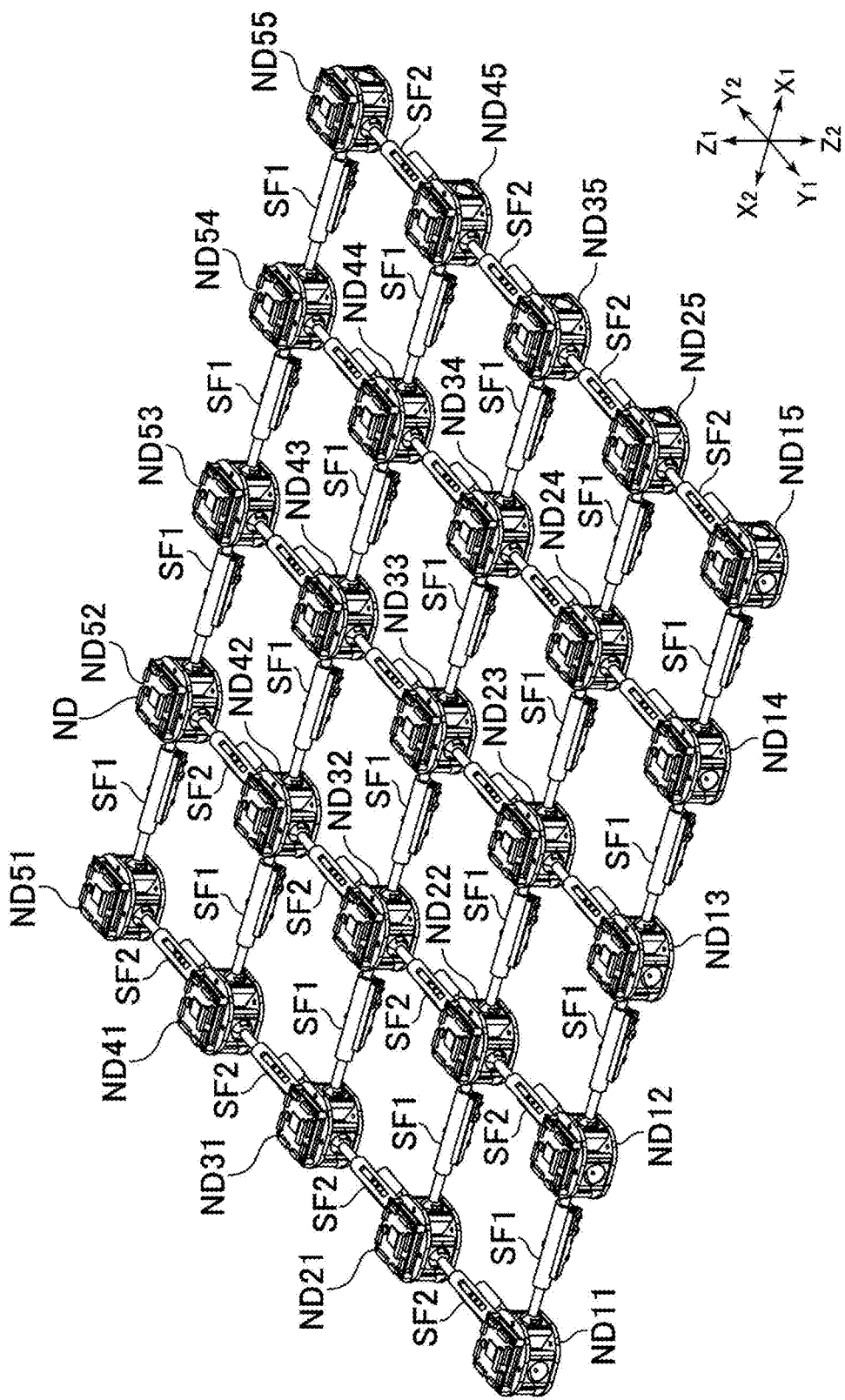
FIG. 2 is a perspective view illustrating an operating device according to the present embodiment.
Figure 3:
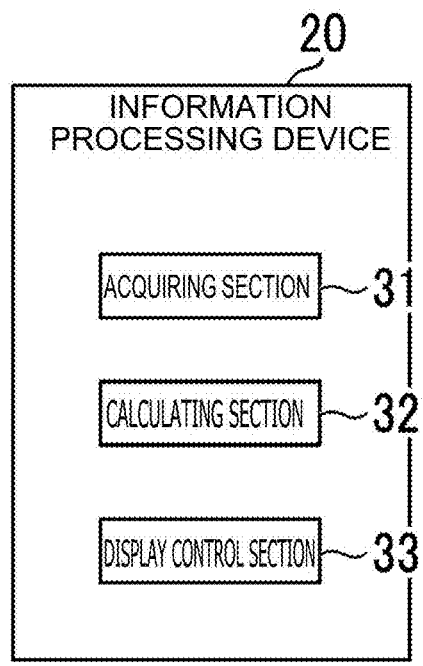
FIG. 3 is a functional block diagram illustrating an example of functions achieved by an information processing device according to the present embodiment.

First, an overview of the display control system 100 according to the present embodiment will be described with reference to FIGS. 1 to 3. FIG. 1 is a diagram illustrating an example of the physical configuration of a display control system according to the present embodiment. FIG. 2 is a perspective view illustrating the operating device of the present embodiment. FIG. 3 is a functional block diagram illustrating an example of functions realized by the information processing device of the present embodiment.

The display control system 100 includes an operating device 10, an information processing device (computer) 20, and a display device 40.

As illustrated in FIG. 2, the operating device 10 is a lattice-shaped device having a plurality of node mechanism sections ND and a plurality of link shafts SF. The operating device 10 outputs a signal to the information processing device 20 in response to a change of the posture due to a user's operation. Note that the operating device 10 may be large enough that the user can grasp both ends thereof with both hands.

The operating device 10 includes three-dimensional magnetic sensors 50, IMUs 60, and position sensors 70, as illustrated in FIG. 1. In the display control system 100, the position coordinates of each node mechanism section ND can be acquired by these various sensors, and the shape of the entire operating device 10 can be recognized. Note that details of the configurations and functions of various sensors and the overall configuration of the operating device 10 will be described later. Incidentally, as will be described later, one node mechanism section ND is provided with four three-dimensional magnetic sensors 50, but in order to avoid complicating the drawing in FIG. 1, only one three-dimensional magnetic sensor 50 is illustrated for one node mechanism section.

The information processing device 20 may be a game device having a game program execution function, a moving image reproducing function, a communication function through the Internet, and the like, for example. The information processing device 20 includes a processor 21, a storage unit 22, a communication unit 23, and an input/output unit 24.

The processor 21 is a program-controlled device such as a CPU that operates according to a program installed in the information processing device 20, for example. The processor 21 has a function of executing a program and generating a moving image as a result of the execution.

The storage unit 22 is a storage element such as a ROM (read only memory) or a RAM (random access memory), or a hard disk drive, for example. The storage unit 22 stores programs executed by the processor 21 and the like.

The communication unit 23 is a communication interface for wired communication or wireless communication, for example.

The input/output unit 24 is an input/output port such as an HDMI (registered trademark) (High-Definition Multimedia Interface) port or a USB (universal serial bus) port, for example.

The operating device 10 is capable of wired or wireless communication with the communication unit 23 included in the information processing device 20.

The display device 40 may be a liquid crystal display etc., for example. Furthermore, the display device 40 may be a head-mounted display that can be worn on the user's head.

As illustrated in FIG. 3, in the information processing device 20, an acquiring section 31, a calculating section 32, and a display control section 33 are fulfilled. The acquiring section 31 is mainly implemented by the processor 21 and the communication unit 23. The calculating section 32 and the display control section 33 are mainly implemented by the processor 21. Each of these functions is fulfilled by a computer executing a program according to the present embodiment. This program may be stored in a computer readable information storage medium.

The acquiring section 31 acquires the position coordinates of a plurality of lattice points included in the operating device 10, respectively. In the present embodiment, the position coordinates of the plurality of lattice points correspond to the position coordinates of the plurality of node mechanism sections ND, respectively. Note that the position coordinates of the plurality of node mechanism sections ND are acquired based on information detected by various sensors included in the operating device 10.

Based on the position coordinates of the lattice points of the plurality of node mechanism sections ND, the calculating section 32 calculates the position coordinates of each of the plurality of control points associated with the lattice points in advance. Note that each of the plurality of control points may be associated with a portion of the display object in advance.

The display control section 33 determines the display mode of each of the plurality of elements included in the display object on the basis of the position coordinates of the plurality of lattice points associated with each of the plurality of elements in advance. Furthermore, the display control section 33 causes the display device 40 to display the display object on the basis of the position coordinates of a plurality of control points that respectively correspond to the position coordinates of a plurality of lattice points.

[Operating Device Configuration]

Next, the configuration of the operating device 10 of the present embodiment will be described mainly with reference to FIG. 2. In FIG. 2, the operating device 10 in a basic posture is illustrated. In the present embodiment, the "basic posture" of the operating device 10 means the posture in which the plurality of node mechanism sections ND are all at the same position in the vertical direction, and the plurality of node mechanism sections ND are equally spaced from each other in the front-rear direction and the right-left direction.

The operating device 10 includes the plurality of node mechanism sections ND and the plurality of link shafts SF.

The node mechanism section ND holds the end of the link shaft SF such that the attitude of the link shaft SF can be changed. One node mechanism section ND holds ends of at least two or more link shafts SF. Further, both ends of all the link shafts SF are held by the node mechanism sections ND, respectively. By employing such a configuration, the operating device 10 has a lattice shape as a whole.

FIG. 2 illustrates an example in which five node mechanism sections ND are arranged side by side in each of the front-rear direction and the right-left direction. That is, an example is illustrated in which the operating device 10 has 25 node mechanism sections ND. Due to such an arrangement, the outer shape of the operating device 10 is substantially rectangular.

Incidentally, although FIG. 2 illustrates a state in which the node mechanism sections ND and the link shafts SF are exposed to the outside, when actually used by a user, the operating device 10 may be entirely covered with a covering member such as cloth. In that case, the covering member preferably has a size and material so as to be capable of being deformed or expanded/contracted according to changes in the posture of the operating device 10.

In FIG. 2, the node mechanism section ND provided at the front left end of the lattice-shaped operating device 10 is denoted by the symbol "ND11." Further, a node mechanism section located at a more rearward or rightward position from the node mechanism section ND11 has a higher number of the symbol. That is, for example, the node mechanism section ND next to and behind the node mechanism section ND11 is denoted by the symbol "ND21," and the node mechanism section ND next to and on the right side of the node mechanism section ND11 is denoted by the symbol "ND12." However, in the present specification, in a case where there is no particular need to distinguish, the node mechanism section will be simply referred to as "node mechanism section ND."

The link shaft SF is held at both ends by the node mechanism sections ND, and connects node mechanism sections ND adjacent to each other among the plurality of node mechanism sections ND. To be specific, the link shaft SF connects node mechanism sections ND adjacent to each other in the right-left direction, and also connects node mechanism sections ND adjacent to each other in the front-rear direction.

As illustrated in FIG. 2, among the plurality of link shafts SF, the shaft that extends in the right-left direction and connects the node mechanism sections ND adjacent to each other in the right-left direction is denoted by the symbol "SF1." Further, among the plurality of link shafts SF, the shaft that extends in the front-rear direction and connects the node mechanism sections ND adjacent to each other in the front-rear direction is denoted by the symbol "SF2." However, in the present specification, in a case where there is no particular need to distinguish, the link shaft will be simply referred to as "link shaft SF."

In addition, in FIG. 2, two link shafts SF are held by each of the node mechanism sections ND11, ND15, ND51, and ND55 arranged at the corners of the lattice-shaped operating device 10. Furthermore, three link shafts SF are held by each of the node mechanism sections ND12 to ND14, etc., which are arranged at ends other than the corners. In addition, four link shafts SF are held by each of the node mechanism section ND22 and others, arranged at positions other than the ends. In this way, the number of link shafts SF held by the node mechanism sections ND varies depending on the arrangement of the node mechanism sections ND, but at least two or more link shafts may be held by one node mechanism section ND.

[Node Mechanism Section]

Figure 4:
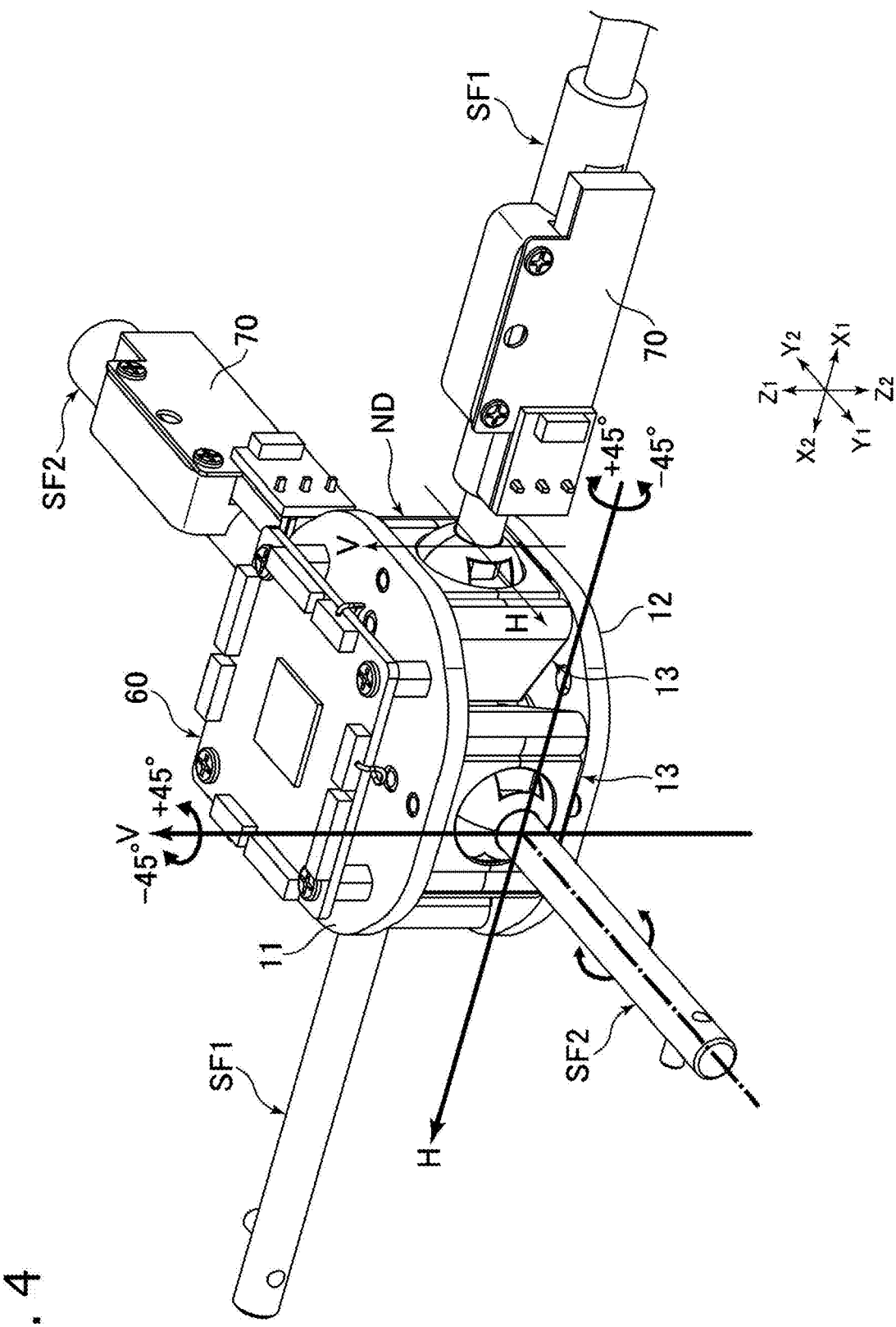
FIG. 4 is a perspective view illustrating one node mechanism section and four link shafts held by the node mechanism section.
Figure 5:
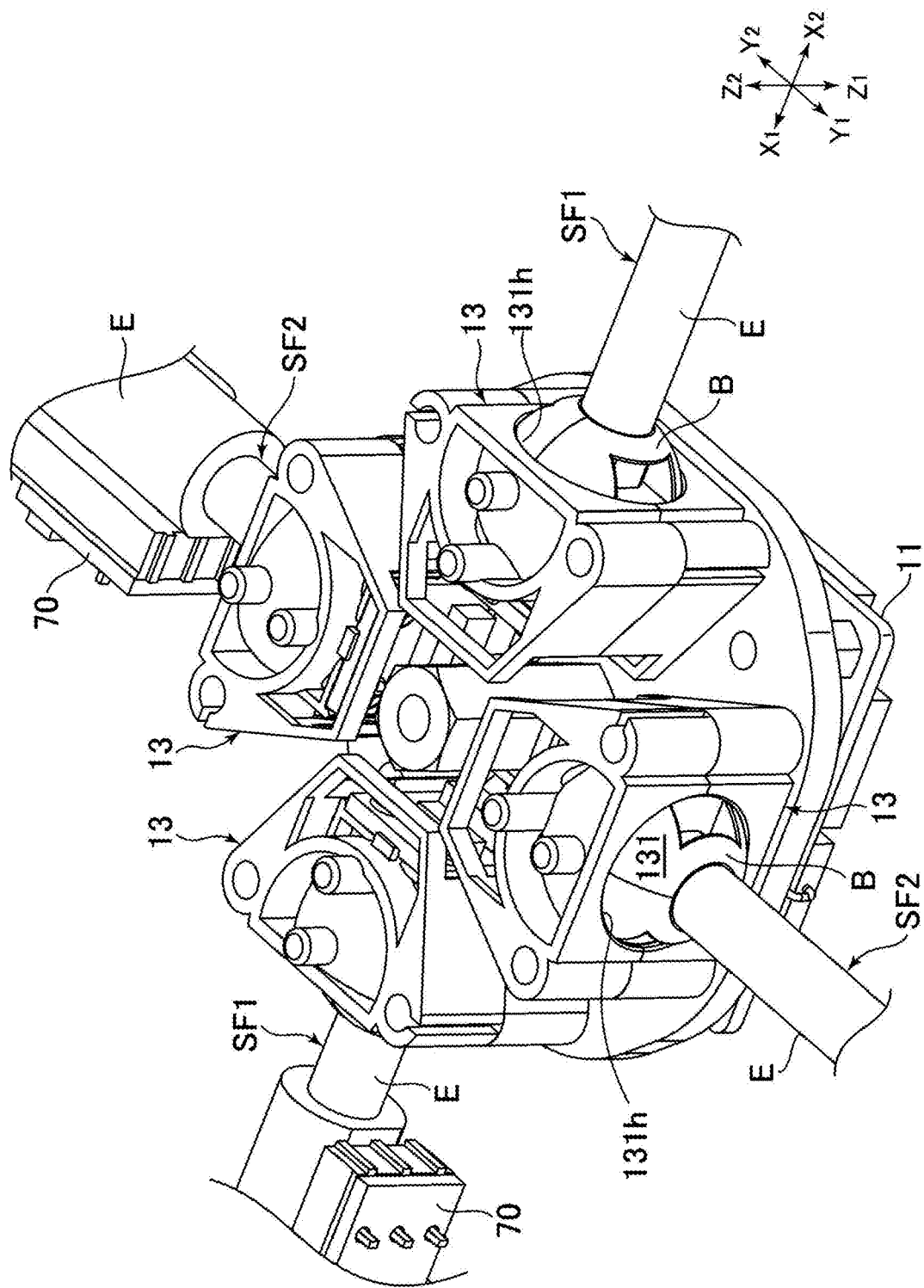
FIG. 5 is a perspective view illustrating a state in which a part of the exterior of the node mechanism section is removed.
Figure 6:
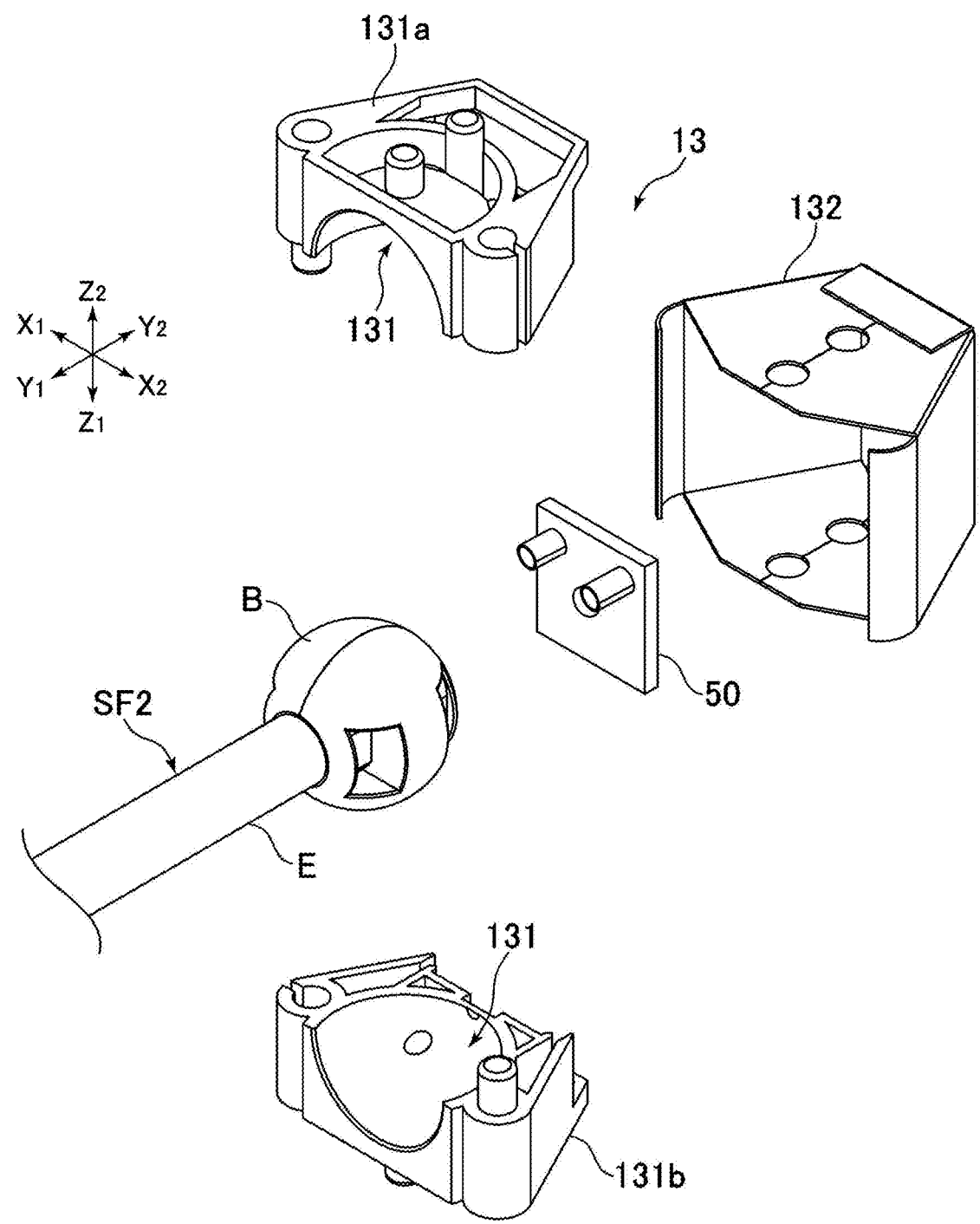
FIG. 6 is an exploded perspective view illustrating a state in which the link shaft is removed from the node mechanism section.

Next, details of the configuration of the node mechanism section ND will be described with reference to FIGS. 4 to 6. FIG. 4 is a perspective view illustrating one node mechanism and four link shafts held by the node mechanism. FIG. 5 is a perspective view illustrating a state in which a part of the exterior of the node mechanism section is removed. FIG. 6 is an exploded perspective view illustrating a state in which the link shaft is removed from the node mechanism section. FIGS. 4 and 5 illustrate the node mechanism section ND to which four link shafts SF extending toward the front, rear, left, and right are attached. Note that FIG. 5 illustrates a state in which the node mechanism illustrated in FIG. 4 is reversed in the vertical direction and at least a lower plate 12 and a mounting part 132 are removed.

The node mechanism section ND includes an upper plate 11, the lower plate 12, and a holding part 13 that is sandwiched between the upper plate 11 and the lower plate 12 and holds an end of the link shaft SF. The holding part 13 is fixed to the upper plate 11 and the lower plate 12.

As illustrated in FIGS. 4 and 5, four holding parts 13 are provided in one node mechanism section ND. This is for the purpose of enabling connection for each pair of the node mechanism sections ND adjacent to each other in the right-left direction and the front-rear direction via the link shaft SF.

In the present embodiment, as illustrated in FIG. 5, the holding part 13 houses a spherical portion B that is an end of the link shaft SF to be described later, and has a housing part 131 having an inner wall that conforms to the shape of the spherical portion B. Further, an opening 131h that opens up the housing part 131 to the outside and has a diameter smaller than the diameter of the spherical portion B is formed on the holding part 13.

Further, as illustrated in FIG. 4, the holding part 13 holds a link shaft SF2 extending forward from the node mechanism section ND so as to allow its angle change at an angle of +45° around an X-axis and +45° around a Z-axis with the holding part 13 as the zero-point. The link shaft SF2 extending rearward from the node mechanism section ND, a link shaft SF1 extending leftward, and the link shaft SF1 extending rightward are held by the holding part 13 so as to similarly allow changes in angles.

As illustrated in FIG. 6, the holding part 13 includes a first member 131a and a second member 131b forming the housing part 131, and the mounting part 132 to which they are attached.

Further, as illustrated in FIG. 6, each of the holding parts 13 is provided with the three-dimensional magnetic sensor 50, which is first detection means for detecting the direction in which the link shaft SF extends with respect to the node mechanism section ND. Since one node mechanism section ND is provided with four holding parts 13, one node mechanism section ND is provided with four three-dimensional magnetic sensors 50. Note that the direction in which the link shaft SF extends with respect to the node mechanism section ND is, in other words, the inclination angle of the link shaft SF relative to the node mechanism section ND.

The three-dimensional magnetic sensor 50 may be provided facing a magnet M provided in the spherical portion B of the link shaft SF, which will be described later, to be able to detect changes in the magnetic field generated from the magnet M. It should be noted that in the present embodiment, as the first detection means, the three-dimensional magnetic sensor 50 capable of detecting magnetic signals in the X-axis, a Y-axis, and the Z-axis directions will be described as an example, but the present invention is not limited to this, and magnetic sensors capable of detecting respective magnetic signals in the axial directions may be provided. Further, the first detection means is not limited to a magnetic sensor and may be any sensor that has a function of detecting the direction in which the link shaft SF extends with respect to the node mechanism section ND.

Here, since a plurality of link shafts SF are held by one node mechanism section ND, a plurality of magnets M are arranged adjacent to each other. Therefore, the plurality of magnets M may magnetically affect each other, and the three-dimensional magnetic sensor 50 may not be able to appropriately detect changes in the magnetic field. Therefore, in the present embodiment, a configuration is adopted in which a part of the holding part 13 includes a magnetic inhibition wall. To be specific, the mounting part 132 is configured by using a magnetic inhibition wall made of an iron plate that reduces the magnetic influence of the magnet M. Thereby, the three-dimensional magnetic sensor 50 can be prevented from being magnetically influenced by the magnets M other than that arranged opposite to the three-dimensional magnetic sensor 50. As a result, in the three-dimensional magnetic sensor 50, the direction can be accurately detected in which the link shaft SF extends with respect to the node mechanism section ND in which the three-dimensional magnetic sensor 50 is provided. Note that the magnetic inhibition wall may be made of a high magnetic permeability material such as permalloy whose main components are iron and nickel.

Further, as illustrated in FIG. 4, the IMU (Inertial Measurement Unit) 60, which is second detection means for detecting the attitude of the node mechanism section ND, is mounted on the upper plate 11. The IMU 60 includes a gyro sensor and an acceleration sensor, and detects the angular velocity and acceleration of the node mechanism section ND. Incidentally, in the present embodiment, an IMU will be used as an example of the second detection means for description, but the second detection means is not limited to this, and any sensor that has a function of detecting the attitude of the node mechanism section ND may be used.

Note that although not illustrated, it is preferable for a microprocessor to be mounted on the lower plate 12. In this microprocessor, various information such as the inclination angle of the link shaft SF and the length of the link shaft SF may be calculated based on the output values of the various sensors. By mounting a microprocessor in each node mechanism section ND in this manner, real-time sensing can be ensured.

[Link Shaft]

Figure 7:
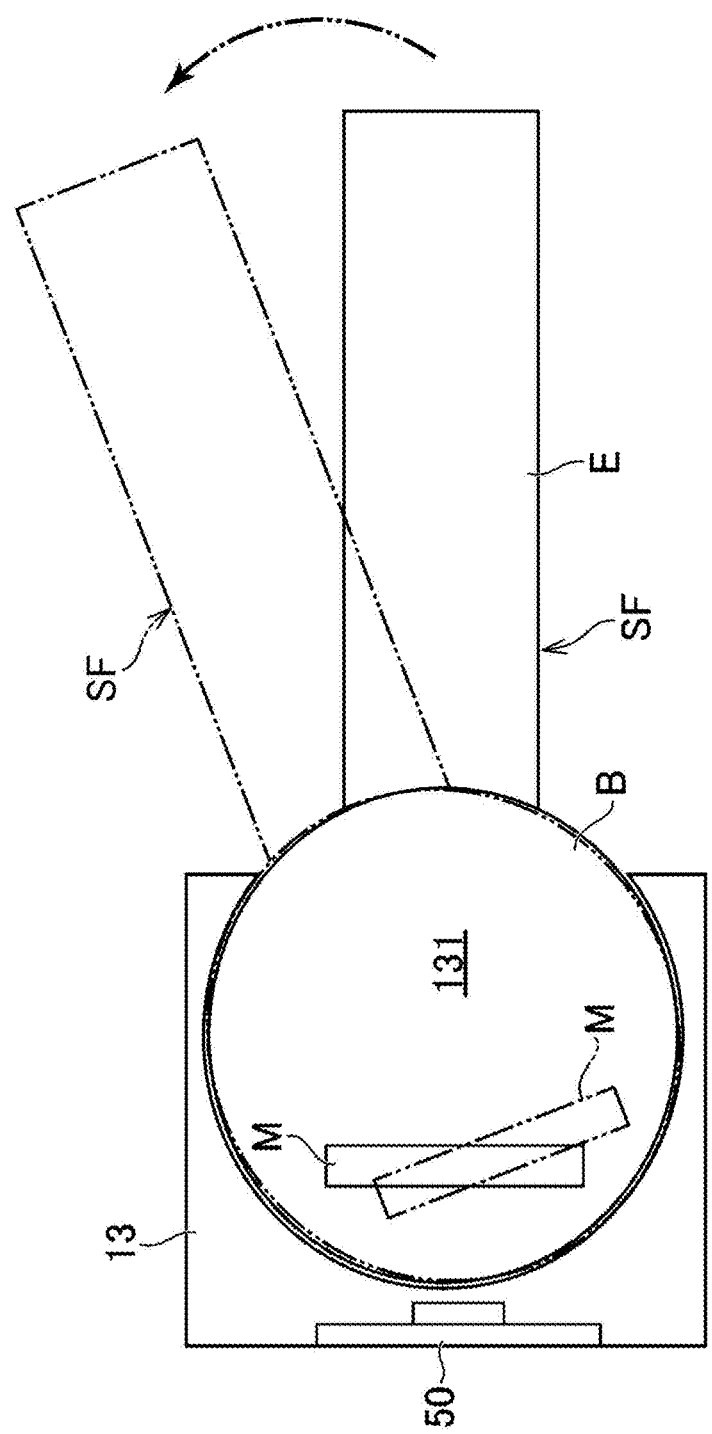
FIG. 7 is a cross-sectional view illustrating how a magnet arranged to face a three-dimensional magnetic sensor is displaced.

Next, details of the configuration of the link shaft SF will be described with reference to FIGS. 4 to 7. FIG. 7 is a cross-sectional view illustrating how a magnet arranged to face a three-dimensional magnetic sensor is displaced.

The link shaft SF has an extending portion E extending in the right-left direction or the front-rear direction, and a spherical portion B forming an end part of the extending portion E. In the present embodiment, the extending portion E has a structure that can be extended and contracted. The extending portion E may be capable of extending and contracting by having two members that are provided so as to be slidable relative to each other. The extending portion E arranged to extend in the right-left direction can be extended and contracted in the right-left direction, and the extending portion E arranged to extend in the front-rear direction can be extended and contracted in the front-rear direction. The maximum length of the extending portion E may be approximately 1.4 times the minimum length.

Further, the position sensor 70, which is third detection means for detecting displacement of the extending portion E, is attached to the extending portion E. The position sensor 70 is a resistive position sensor, for example, and may include a variable resistor that converts a change of the mechanical position into an analog electrical signal. The displacement of the extending portion E detected by the position sensor 70 may be output to the information processing device 20 as information regarding the distance between two node mechanism sections ND that hold respective ends of the link shaft SF having the extending portion E.

Further, as illustrated in FIG. 7, the magnet M is embedded in the spherical portion B. The magnet M may be a permanent magnet. The magnet M may be provided so as to face the three-dimensional magnetic sensor 50 provided in the node mechanism section ND. The orientation of the magnet M changes depending on the change of extension direction of the link shaft SF relative to the node mechanism section ND. As the orientation of the magnet M is changed, the magnetic field detected by the three-dimensional magnetic sensor 50 changes. The change in the magnetic field detected by the three-dimensional magnetic sensor 50 may be output to the information processing device 20 as information regarding the direction in which the link shaft SF extends relative to the node mechanism section ND.

Note that the solid line in FIG. 7 depicts the link shaft SF in a state where the operating device 10 is in the basic posture, and the broken line in FIG. 7 depicts the link shaft SF in a state inclined relative to the node mechanism section ND. The state indicated by the solid line in FIG. 7 and the state indicated by the broken line in FIG. 7 differ in the attitude of the magnet M with respect to the three-dimensional magnetic sensor 50, so that the magnetic field detected by the three-dimensional magnetic sensor 50 differs.

[Transmission Path]

Figure 8:
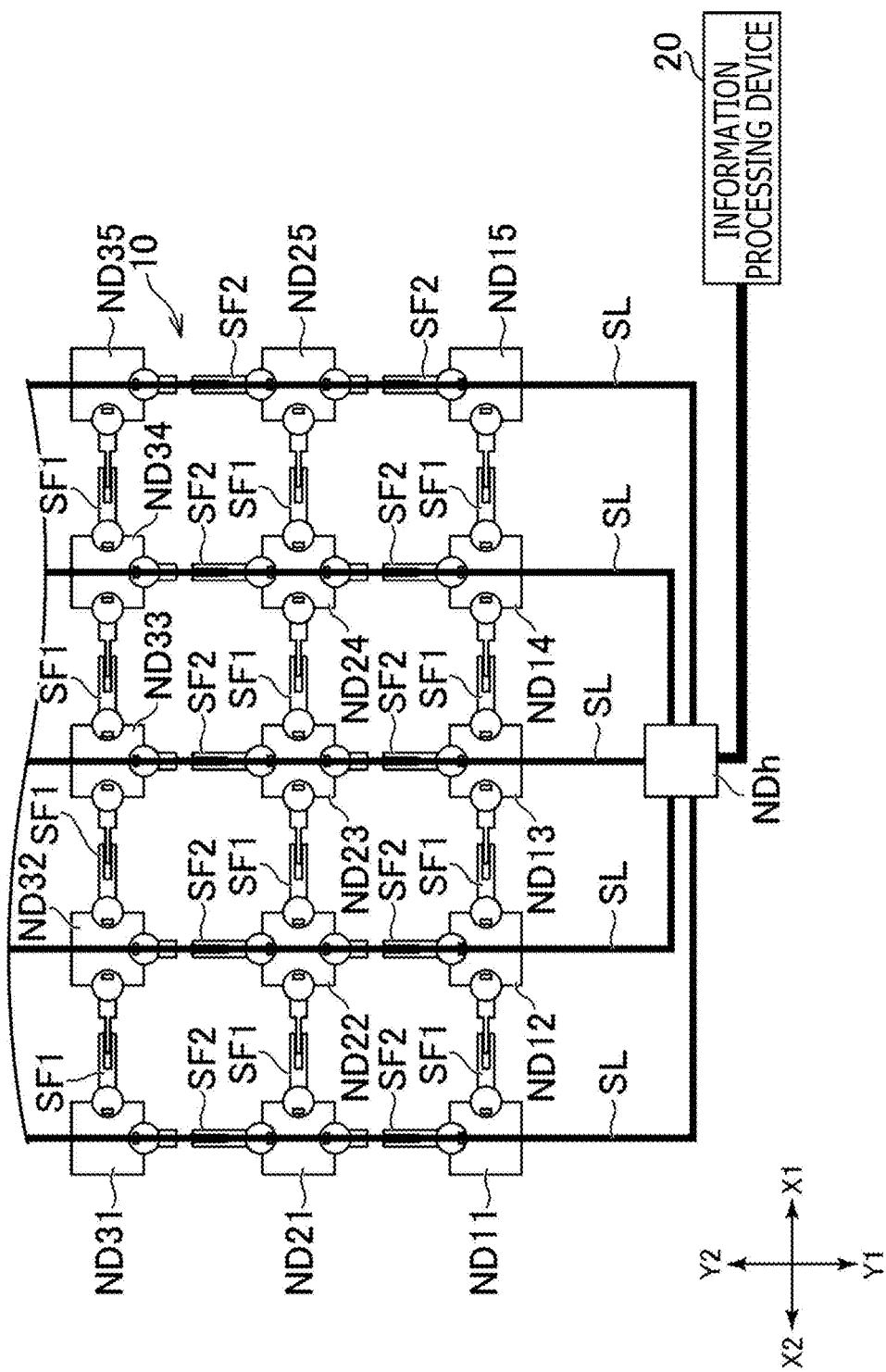
FIG. 8 is a diagram schematically illustrating the wiring configuration of the display control system according to the present embodiment.

Next, with reference to FIG. 8, the transmission path of the display control system 100 according to the present embodiment will be described. FIG. 8 is a diagram schematically illustrating the wiring configuration of the display control system according to the present embodiment. Note that in FIG. 8, the node mechanism section ND and the link shaft SF are partially omitted from illustration, but their arrangement is the same as that illustrated in FIG. 2.

As described above, the three-dimensional magnetic sensor 50 and the IMU 60 are mounted in each of the plurality of node mechanism sections ND. Moreover, the position sensor 70 is mounted on each of the plurality of shafts SF. Signals detected by these sensors are output to the information processing device 20. If signal lines are individually connected to the plurality of node mechanism sections ND, respectively, the wiring becomes complicated.

Therefore, in the present embodiment, a configuration is adopted in which five node mechanism sections ND arranged in the front-rear direction output signals to the information processing device 20 through a common transmission path. To be specific, as illustrated in FIG. 8, a common signal line SL is connected to five node mechanism sections ND arranged in the front-rear direction. That is, in the present embodiment, five signal lines SL arranged in the right-left direction are employed.

Furthermore, in the present embodiment, a host node mechanism section Ndh is provided as an information aggregation section for aggregating signals sent through the five signal lines SL. As a result, signals from 25 node mechanism sections ND can be aggregated by one host node mechanism section NDh and output to the communication unit 23 of the information processing device 20 via the host node mechanism section NDh (see FIG. 1). Note that, although a term, that is, host node mechanism section NDh is used here for convenience, the configuration of the host node mechanism section NDh is different from that of the node mechanism section ND. That is, the host node mechanism section Ndh does not have various sensors or the like.

Further, the power supply line may also have the same wiring configuration as the signal line SL illustrated in FIG. 8. In other words, power may be supplied to the five node mechanism sections ND arranged in the front-rear direction through a common power supply line.

Note that although an example has been described here in which the operating device 10 includes the signal lines SL and the power lines, the present invention is not limited to this, signals may be sent to the information processing device 20 by wireless communication. In this case, each node mechanism section ND may be provided with a wireless communication circuit. By using the wireless communication technology in this manner, since wiring is not required, the posture of the operating device 10 can be changed more flexibly.

[Acquisition of Position Coordinates of Node Mechanism Section]

Figure 9:
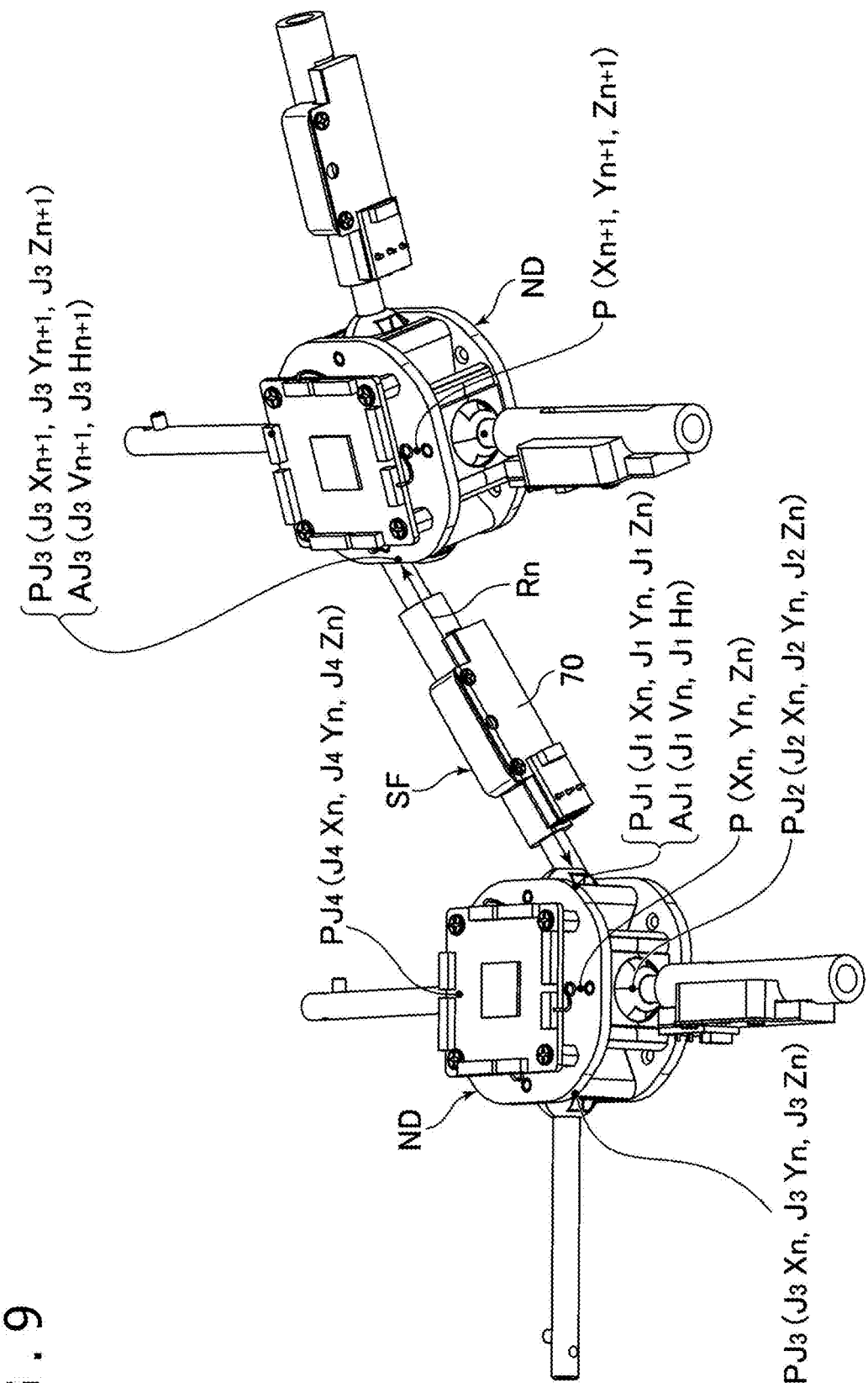
FIG. 9 is a diagram illustrating a position coordinates of each part of the node mechanism sections.

Next, with reference to FIG. 9, acquisition of the position coordinates of the node mechanism section ND will be described. FIG. 9 is a diagram illustrating the position coordinates of each part of the node mechanism section. Here, a node number is assigned to each of the plurality of node mechanism sections ND. That is, as illustrated in FIG. 2, in an example in which there are 25 node mechanism sections ND, each node mechanism section ND is assigned one of node numbers 1 to 25. In FIG. 9, a node mechanism section ND of node number n and a node mechanism section ND of node number n+1 adjacent to the node mechanism section ND of node number n are illustrated.

FIG. 9 illustrates the state in which the link shaft SF connecting the node mechanism sections ND of node number n and node number n+1 is tilted, and the node mechanism section ND of node number n+1 itself is tilted in posture. Hereinafter, acquisition of the position coordinates of the node mechanism section ND of node number n+1 in this state will be described.

The coordinates of the center position of the node mechanism section ND of node number n are assumed to be $P_n$ ($X_n$, $Y_n$, $Z_n$). Further, the coordinates of the center position of the node mechanism section ND of node number n+1 are assumed to be $P_{n+1}$ ($X_{n+1}$, $Y_{n+1}$, $Z_{n+1}$). Still further, in the present embodiment, the coordinates of the center position of the node mechanism section ND are taken as the position coordinates of the node mechanism section ND.

In addition, the coordinates of the holding positions of the four link shafts SF held by the node mechanism section ND of node number n are expressed as $PJ_m$ ($J_mX_n$, $J_mY_n$, $J_mZ_n$) (m is shaft number 1 to 4). In the present embodiment, the holding position is assumed to be the center of the spherical portion B of the shaft SF. As illustrated in FIG. 9, the first holding position $PJ_1$ is a position opposite to the third holding position PJ3 across the center position of the node mechanism section ND. Further, the second holding position PJ2 is a position opposite to the fourth holding position $PJ_4$ across the center position of the node mechanism section ND.

Similarly, the coordinates of the holding positions of the four link shafts SF held by the node mechanism section ND of node number n+1 are expressed as $PJ_m$ ($J_mX_{n+1}$, $J_mY_{n+1}$, $J_mZ_{n+1}$) (m is shaft number 1 to 4).

In addition, the angles around a V-axis (yaw axis) and an H-axis (pitch axis) illustrated in FIG. 4 of the link shaft SF held by the node mechanism section ND of node number n are assumed to be $AJ_m$ ($J_mV_n$, $J_mH_n$).

Further, the length between the first holding position $PJ_1$ and the third holding position $PJ_3$ in each node mechanism section ND is assumed to be W. Further, the length from the first holding position $PJ_1$ of the link shaft SF where one end thereof is held by the node mechanism section ND of node number n, to the third holding position PJ3 of the link shaft SF where the other end thereof is held by the node mechanism section ND of node number n+1 is assumed to be Rn. The length W is a preset fixed length, and the length Rn is a length that changes depending on the length of the link shaft SF that can extend and contract.

For example, in a case where the coordinates of the center position of the node mechanism section ND of node number n are defined as (0, 0, 0), the coordinates ($J_1X_n$, $J_1Y_n$, $J_1Z_n$) of the first holding position $PJ_1$ in the node mechanism section ND becomes (W/2, 0, 0). Similarly, the coordinates ($J_2X_n$, $J_2Y_n$, $J_2Z_n$) of the second holding position PJ2 are (0, −W/2, 0), and the coordinates ($J_3X_n$, $J_3Y_n$, $J_3Z_n$) of the third holding position $PJ_3$ are (−W/2, 0, 0), and the coordinates ($J_4X_n$, $J_4Y_n$, $J_4Z_n$) of the fourth holding position $PJ_4$ are (0, w/2, 0).

Furthermore, the coordinates ($J_3X_{n+1}$, $J_3Y_{n+1}$, $J_3Z_{1n+1}$) of the third holding position $PJ_3$ in the node mechanism section ND of node number n+1 are expressed as follows by polar coordinate transformation on the basis of the first holding position $PJ_1$ in the node mechanism section ND of node number n and the angle $AJ_1$ around the V-axis and H-axis of the link shaft SF held by the first holding position $PJ_1$.

$$J_3X_{n+1} = J_1X_n + R_n \times \sin(90° - J_1V_n) \times \cos(J_1H_n)$$

$$J_3Y_{n+1} = J_1Y_n + R_n \times \sin(90° - J_1V_n) \times \sin(J_1H_n)$$

$$J_3Z_{n+1} = J_1Z_n + R_n \times \cos(90° - J_1V_n)$$

Further, the inclination of the attitude of the node mechanism section ND of node number n+1 itself, namely the angles around the V-axis and the H-axis are assumed to be ($V_{n+1}$, $H_{n+1}$). In this case, the coordinates P ($X_{n+1}$, $Y_{n+1}$, $Z_{n+1}$) of the center position of the node mechanism section ND of node number n+1 are expressed as follows on the basis of the coordinates ($J_3X_{n+1}$, $J_3Y_{n+1}$, $J_3Z_{n+1}$) of the third holding position $PJ_3$ in the node mechanism section ND of node number n+1.

$$X_{n+1} = J_3X_{n+1} + W/2 \times \sin(90° - V_{n+1}) \times \cos(H_{n+1})$$

$$Y_{n+1} = J_3Y_{n+1} + W/2 \times \sin(90° - V_{n+1}) \times \sin(H_{n+1})$$

$$Z_{n+1} = J_3X_{n+1} + W/2 \times \cos(90° - V_{n+1})$$

As described above, the position coordinates of the node mechanism section ND of node number n+1 can be calculated based on the inclination of the attitude of the node mechanism section ND of node number n+1 itself, the inclination angle of the link shaft SF with respect to the node mechanism section ND of node number n, and the length of the link shaft SF, in addition to the position coordinates of the node mechanism section ND of node number n. By performing such calculations according to the number of node mechanism sections ND, the position coordinates of all node mechanism sections ND can be obtained. Note that the inclination angle of the link shaft SF is detected based on the output value of the three-dimensional magnetic sensor 50, and the length of the link shaft SF is detected based on the output value of the position sensor 70, and further the inclination of the attitude of the node mechanism section ND itself is detected based on the output value of the IMU 60.

However, it is not essential to calculate the position coordinates of all node mechanism sections ND in a similar way, and estimate values estimated from the position coordinates of surrounding node mechanism sections ND or others may be used.

[Relation Between Link Shaft Inclination Angle and Three-Dimensional Magnetic Sensor Output Value]

Figure 10:
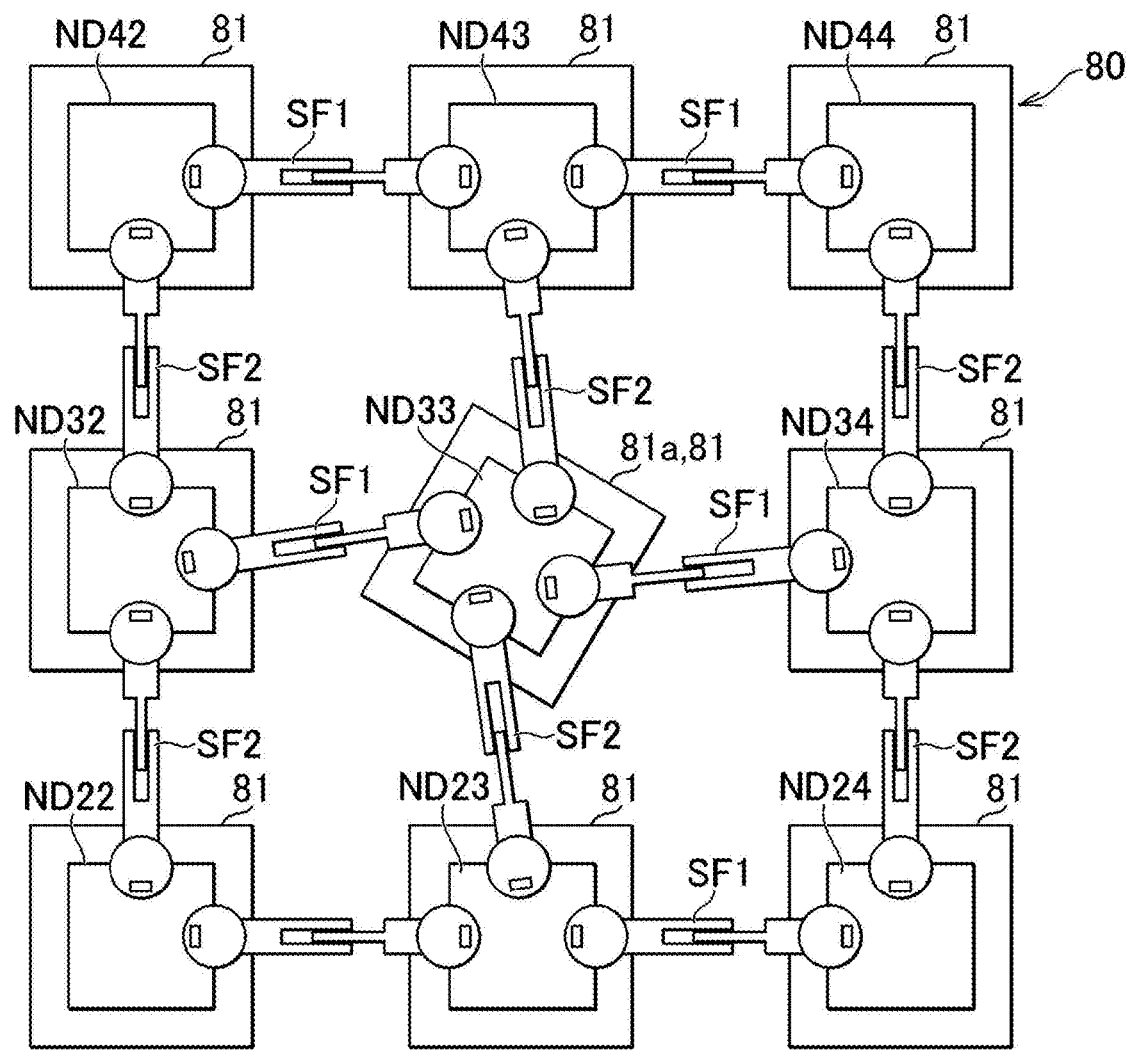
FIG. 10 is a top view illustrating how the operating device is attached to a jig.
Figure 11:
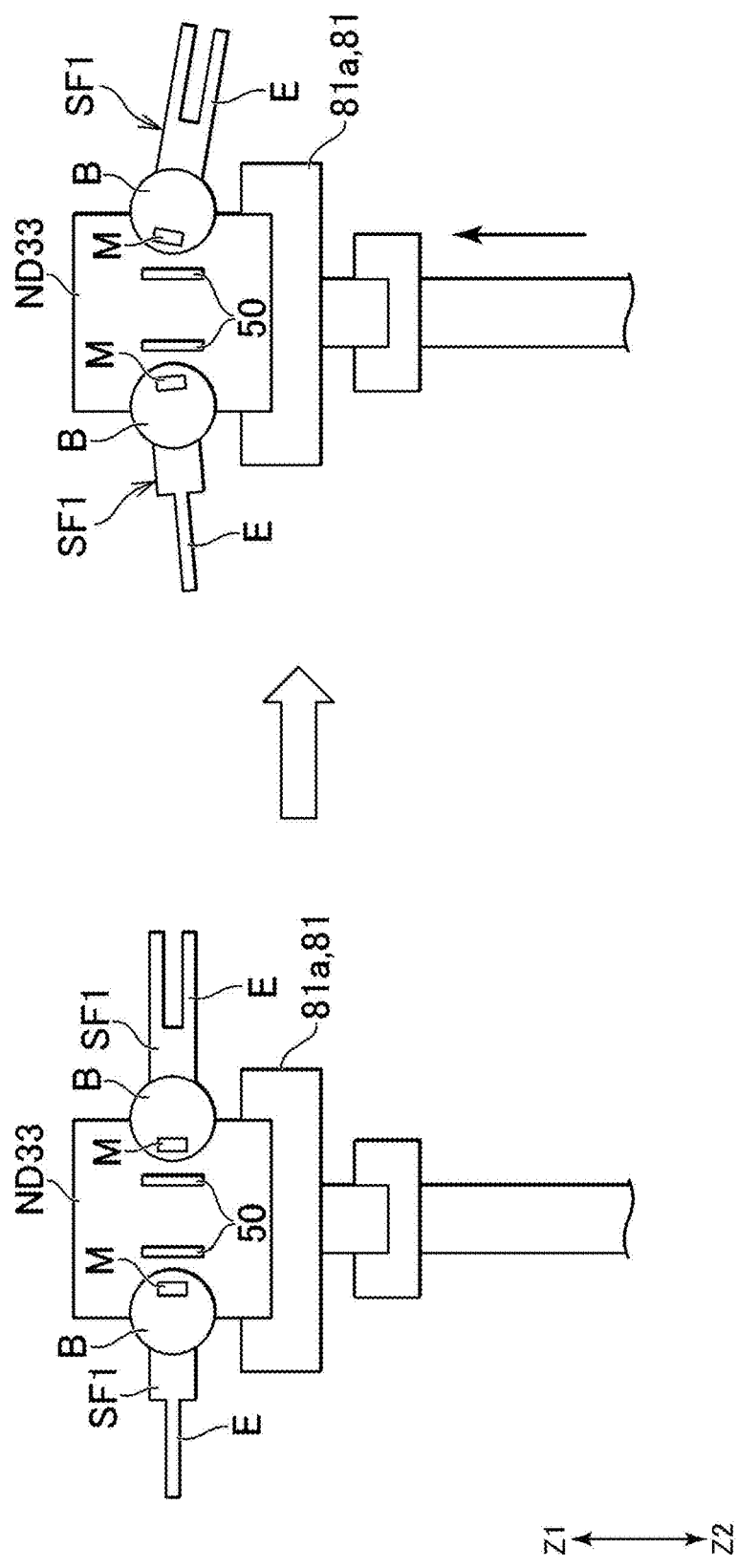
FIG. 11 is a side view illustrating how the operating device is attached to the jig.

Next, the relation between the inclination angle of the link shaft SF and the output value of the three-dimensional magnetic sensor 50 in the present embodiment will be described with reference to FIGS. 10 and 11. FIG. 10 is a top view illustrating how the operating device is attached to a jig. FIG. 11 is a side view illustrating how the operating device is attached to the jig. Note that in FIG. 10, the node mechanism section ND and the link shaft SF are partially omitted from the illustration and their arrangement is the same as that illustrated in FIG. 2.

As described above, the three-dimensional magnetic sensor 50 detects the direction in which the link shaft SF extends with respect to the node mechanism section ND on the basis of the detected magnetic field. That is, the inclination angle of the link shaft SF is detected. Then, in the display control system 100, the position coordinates of the node mechanism section ND are acquired based on various sensor outputs including information regarding the inclination angle of the link shaft SF, and the display object is displayed based on the acquired position coordinates. Here, since the magnetic field detected by each three-dimensional magnetic sensor 50 is affected by individual differences, each link shaft SF (each three-dimensional magnetic sensor 50) is preferably calibrated in advance to reduce the influence of these individual differences. Note that the individual differences are caused by tolerances in the position of the magnets M or specific magnetic variations of the magnets M themselves, for example.

However, it takes a long time to sequentially calibrate each of the link shafts SF piece by piece held by the node mechanism sections ND. Therefore, in the present embodiment, a dedicated jig 80 is used to calibrate the plurality of link shafts SF held by one node mechanism section ND together at one time.

The jig 80 includes the same number of placing portions 81, on which the node mechanism sections ND are placed, as the number of node mechanism sections ND. At least one of the plurality of placing portions 81 is movable up and down along the Z-axis and rotatable around the Z-axis as a central axis. By the placing portion 81 operating in this manner, each link shaft SF can be set at any angle. In FIG. 10, the movable placing portion 81 is illustrated as a "placing portion 81a," and how a node mechanism section ND33 is placed on the placing portion 81a is illustrated.

FIG. 10 illustrates how the inclination angles of the four link shafts SF held by the node mechanism section ND33 change because the placing portion 81a on which the node mechanism section ND33 is placed rotates around the Z-axis. It is preferable to obtain each of the output values of the four three-dimensional magnetic sensors 50 provided in the node mechanism section ND with the inclination angle changed in this manner. Further, for example, it is preferable to obtain output values in each state by changing the inclination angle of the link shaft SF in increments of 5°. In addition, in the state illustrated in FIG. 10, the lengths of the four link shafts SF held by the node mechanism section ND33 are extended as the inclination angle of the node mechanism section ND33 changes.

Further, as illustrated in FIG. 10, as the inclination angle at one end of each of the four link shafts SF held by the node mechanism section ND33 changes, the inclination angle at the other end of each of the four link shafts SF also changes. That is, the inclination angles of the link shafts SF held by node mechanism sections ND23, ND32, ND34, and ND43 have changed. By using the jig 80 illustrated in FIG. 10 in this manner, eight output values corresponding to the inclination angles of one ends and the other ends of the four link shafts SF can be acquired together at one time.

Furthermore, FIG. 11 illustrates how the inclination angles of the four link shafts SF held by the node mechanism section ND33 change as the placing portion 81a on which the node mechanism section ND33 is placed moves upward. How the inclination angle of the link shaft SF has changed is illustrated. Even in this case, it is preferable to obtain the output values of the four three-dimensional magnetic sensors 50 provided in the node mechanism section ND, respectively, with the inclination angle of the link shaft SF changed. Further, it is preferable to obtain output values in each state by changing the inclination angle of the link shaft SF in increments of 5°, for example.

Display Example of Display Object

Figure 12:
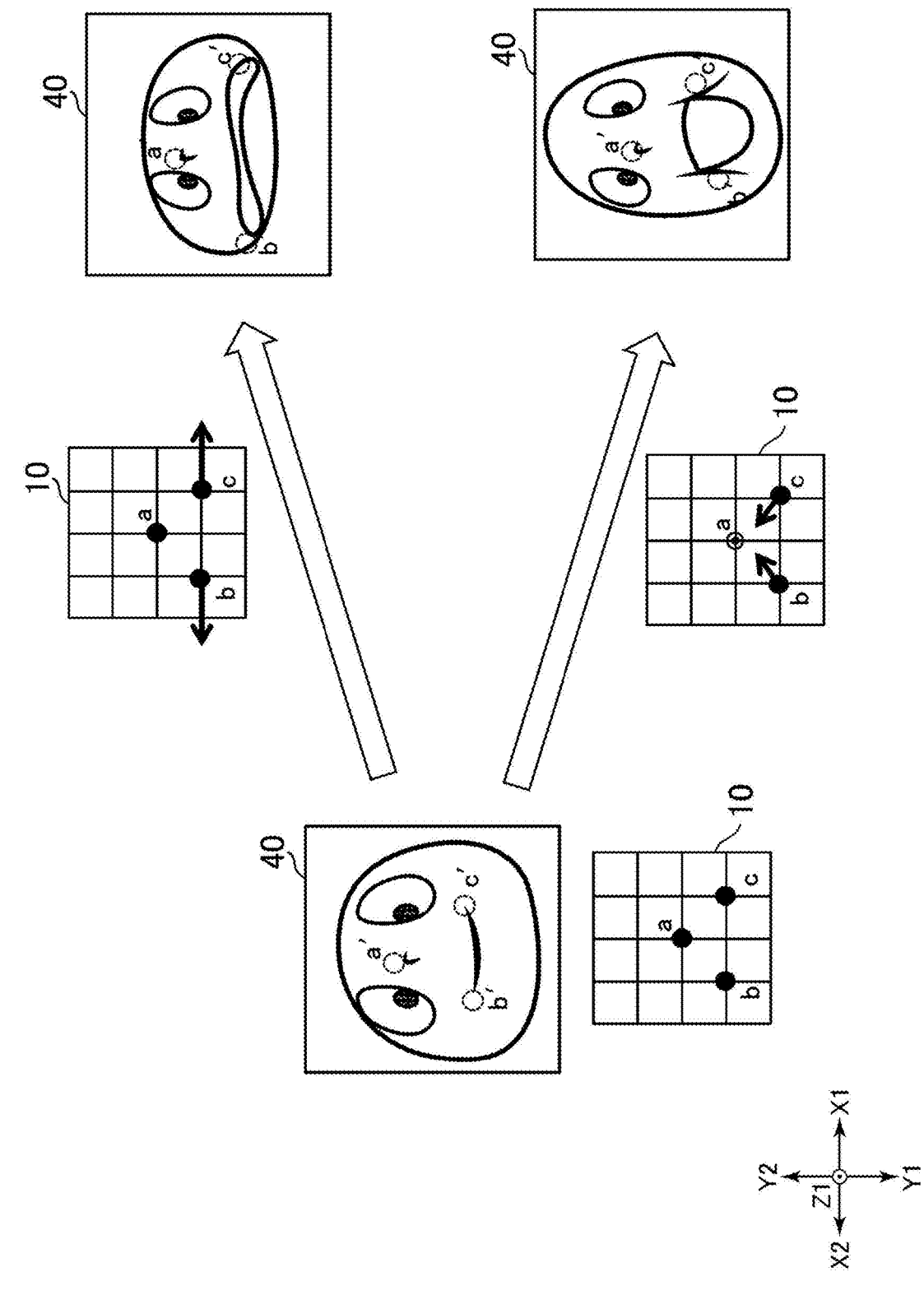
FIG. 12 is a diagram illustrating display examples of display objects displayed in the present embodiment.
Figure 13:
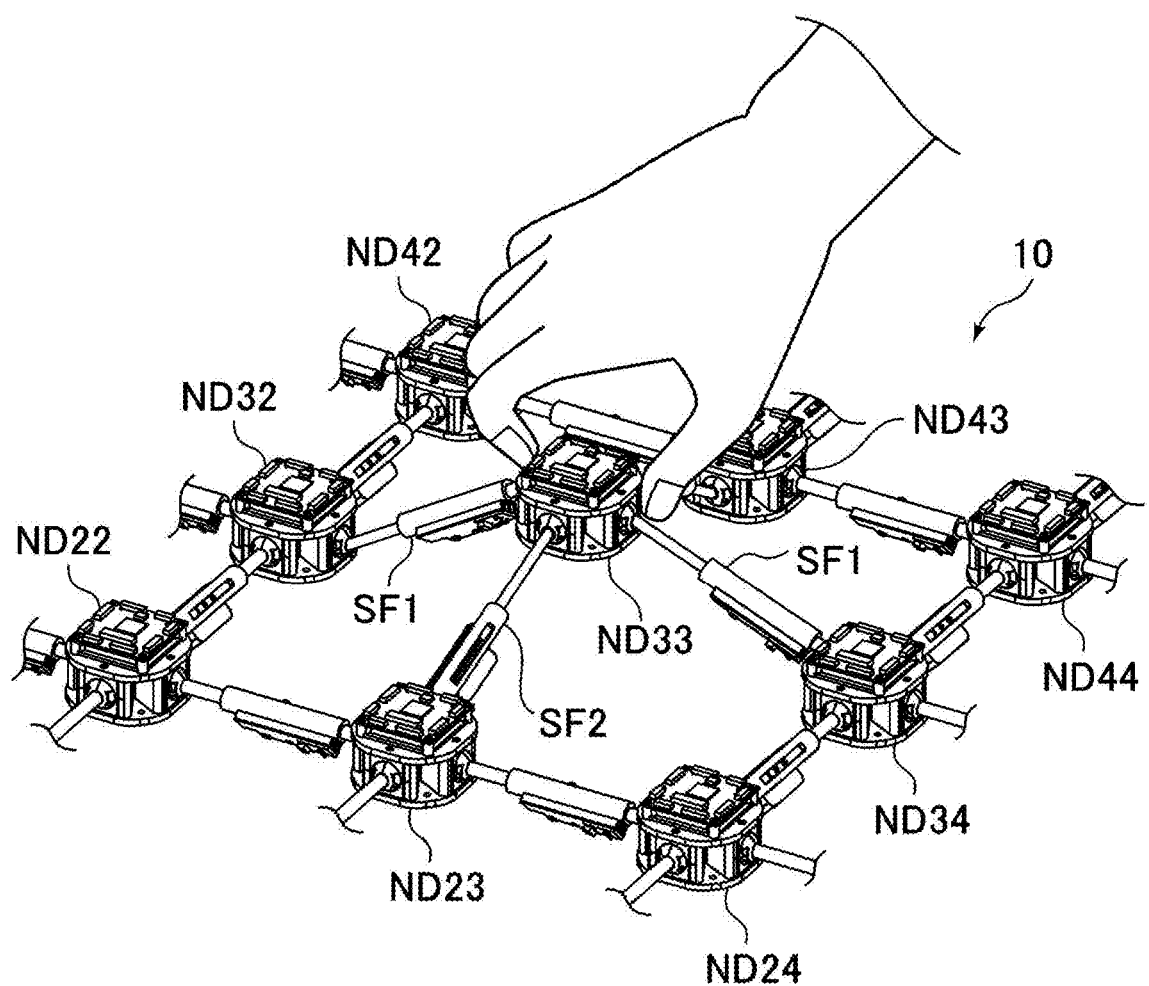
FIG. 13 is a diagram illustrating a user's operation of picking up the node mechanism section.

Next, a display example of display objects in the display control system 100 according to the present embodiment will be described with reference to FIGS. 12 and 13. FIG. 12 is a diagram illustrating a display example of display objects displayed in the present embodiment. FIG. 13 is a diagram illustrating a user's operation of picking up the node mechanism section.

FIG. 12 schematically illustrates how the user operates the operating device 10, and also illustrates display objects that change according to the operation. In FIG. 12, a face, which is a three-dimensional object, is illustrated as a display object displayed on the screen of the display device 40. In FIG. 12, the face before change is illustrated on the left side of the figure. That is, the face displayed when the operating device 10 is in the basic posture is illustrated. On the other hand, the right side of the figure illustrates the faces after the change. In other words, the face displayed when the operating device 10 is changed from its basic posture is illustrated.

A plurality of control points are associated with a face, which is a three-dimensional object, in advance. Further, the plurality of control points are associated with a plurality of lattice points of the operating device 10 in advance, respectively. FIG. 12 illustrates lattice points a to c and control points a' to c' that are previously associated with these lattice points a to c. FIG. 12 illustrates an example in which control point a' is associated with the vicinity of the nose on the face, and control points b' and c' are associated with the vicinity of the mouth on the face.

First, the information processing device 20 uses the acquiring section 31 to acquire the position coordinates of the lattice points a to c of the operating device 10, respectively. That is, the respective position coordinates of the node mechanism section ND corresponding to the lattice points a to c are obtained.

Then, the information processing device 20 uses the calculating section 32 to calculate the position coordinates of the control points a' to c' on the basis of the position coordinates of the lattice points a to c.

The information processing device 20 uses the display control section 33 to cause the display device 40 to display the face, which is a three-dimensional object, based on the position coordinates of the control points a' to c'.

The upper right side of FIG. 12 illustrates how lattice points b and c are separated from each other in the right-left direction by changing the posture of the operating device 10 so as to spread the operating device 10 in the right-left direction. Since the distance between the control points b' and c' increases due to change of the posture of the operating device 10 in this way, the face, which is a three-dimensional object, is displayed so as to spread out in the right-left direction.

As illustrated in FIG. 12, the outer shape of the display object and the outer shape of the operating device 10 do not have to match with each other. That is, the outer shape of the display object and the outer shape formed by connecting a plurality of lattice points may be dissimilar.

Further, the position coordinates of a control point may be determined according to the amount of movement of a lattice point associated with the control point in advance. In other words, the position coordinates of the control point may be determined according to the difference between the position coordinates of the lattice point before movement and the position coordinates of the lattice point after movement.

Further, the lower right side of FIG. 12 illustrates the face when the node mechanism section ND33 corresponding to the lattice point a of the operating device 10 moves upward due to the user's picking-up action of the node mechanism section ND33. Here, the picking-up action refers to an action in which the user pinches a predetermined node mechanism section ND and lifts the section upward, as illustrated in FIG. 13. When the node mechanism section ND33 is picked up, the four link shafts SF held by the node mechanism section ND33 will be tilted due to the weight of the four node mechanism sections ND adjacent to the node mechanism section ND33 in the front, rear, left, and right directions. In addition, the four link shafts SF held by the picked-up node mechanism section ND33 are each lengthened by the weight of each of the four node mechanism sections ND adjacent to the picked-up node mechanism section ND33 in the front, rear, left, and right directions.

As described above, lattice point a is associated with control point a' corresponding to the vicinity of the nose on the face. Therefore, when the lattice point a moves upward, the facial expression changes so that the face is pulled forward.

When the user releases the node mechanism section ND33 from the state illustrated in FIG. 13, the node mechanism section ND33 may preferably move downward due to its own weight. Thereby, the operating device 10 is in the state before the picking-up operation is performed.

Accordingly, the face displayed on the display device 40 may preferably return to the expression illustrated on the left side of FIG. 12. In this way, in this example, the shape of the face (display object) can be changed not only two-dimensionally, but also three-dimensionally. As a result, a wide variety of variations can be made in the shape of the face.

[Flowchart]

Figure 14:
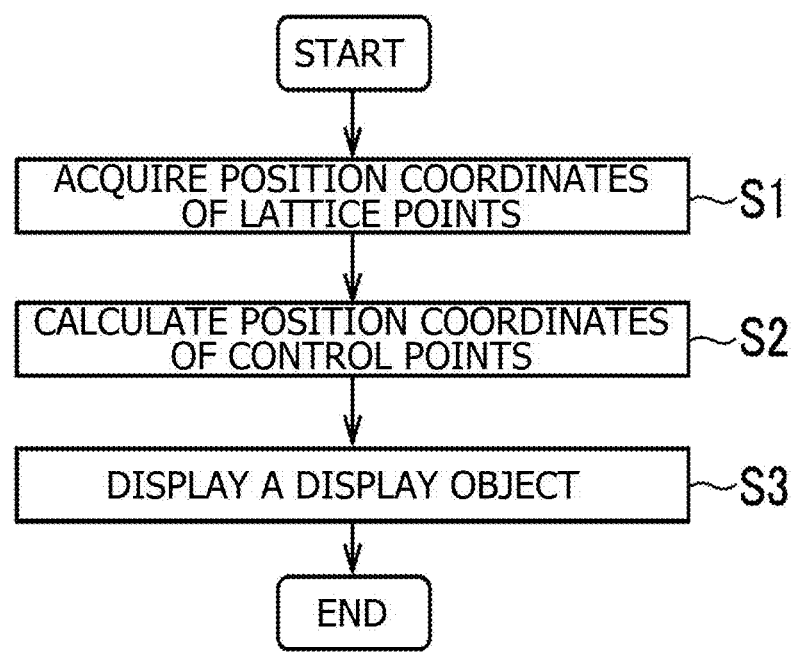
FIG. 14 is a flowchart illustrating a processing flow in the information processing device of the present embodiment.

Next, the processing flow in the information processing device 20 will be described with reference to FIG. 14. FIG. 14 is a flowchart illustrating the processing flow in the information processing device of the present embodiment.

First, the acquiring section 31 acquires each of the position coordinates of a plurality of lattice points of the operating device 10 (step S1). Next, the calculating section 32 calculates the position coordinates of the plurality of control points on the basis of the position coordinates of the plurality of lattice points (step S2). Next, the display control section 33 causes the display device 40 to display a display object on the basis of the position coordinates of the plurality of control points (step S3).

Figure 15:
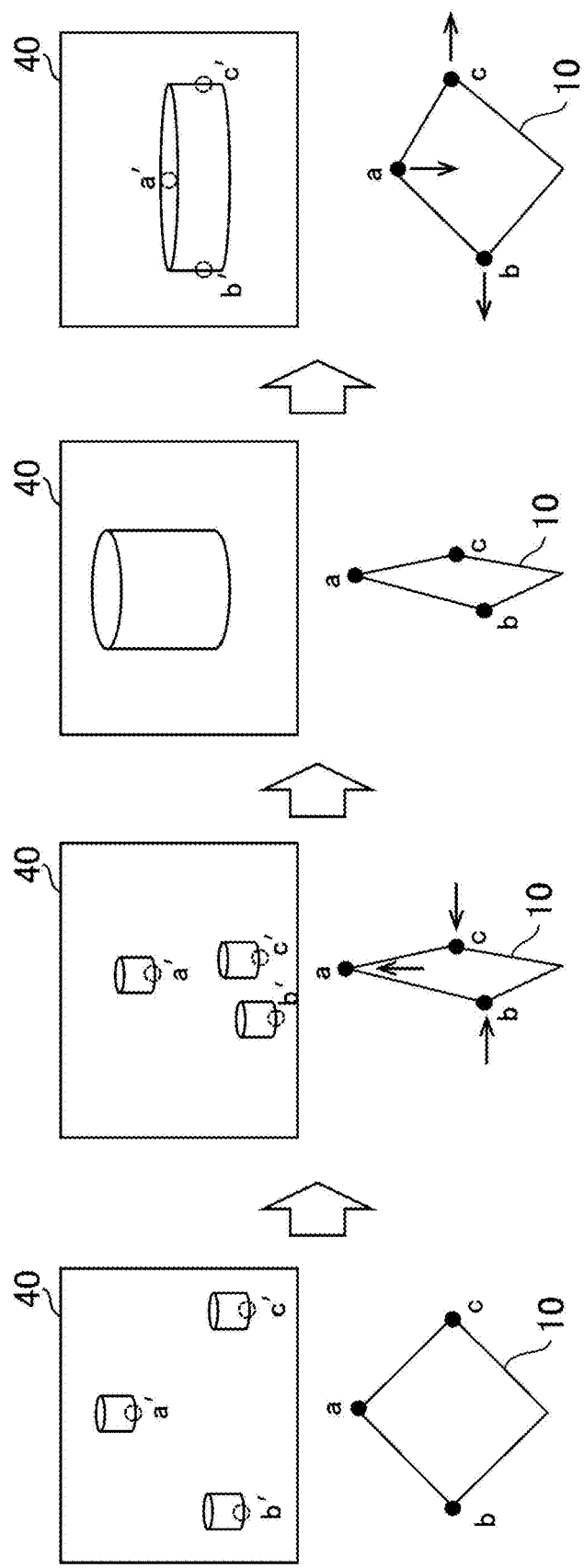
FIG. 15 is a diagram illustrating display examples of display objects displayed in the present embodiment.

Furthermore, with reference to FIG. 15, another display example of display objects will be described. FIG. 15 is a diagram illustrating display examples of display objects displayed in the present embodiment.

Similarly to FIG. 14, FIG. 15 schematically illustrates how the user operates the operating device 10, and also illustrates display objects that change according to the operation. In FIG. 15, as display objects displayed on the screen of the display device 40, three cylindrical objects (hereinafter referred to as cylindrical objects) are illustrated as parts constituting a three-dimensional object. The three cylindrical objects are previously associated with control points a' to c', respectively.

In the present example, in a case where the interval between the position coordinates of any of the three cylindrical objects falls within a predetermined range, the display control section 33 is intended to integrate the three cylindrical objects and displays a new object. FIG. 15 illustrates how three cylindrical objects are integrated and one large cylindrical object is displayed because the control point b' and the control point c' become close to each other.

Furthermore, in the present example, control points a' to c' are newly associated with one large cylindrical object. As a result, the shape of one large cylindrical object changes as the posture of the operating device 10 changes due to the user's operation.

It is to be noted that although FIG. 15 illustrates an example in which a new object is displayed according to the interval between a plurality of control points, that is, the density of a plurality of lattice points, the present invention is not limited to this. For example, a new object may be displayed based on the amount and speed of movement of the lattice points.

Figure 16:
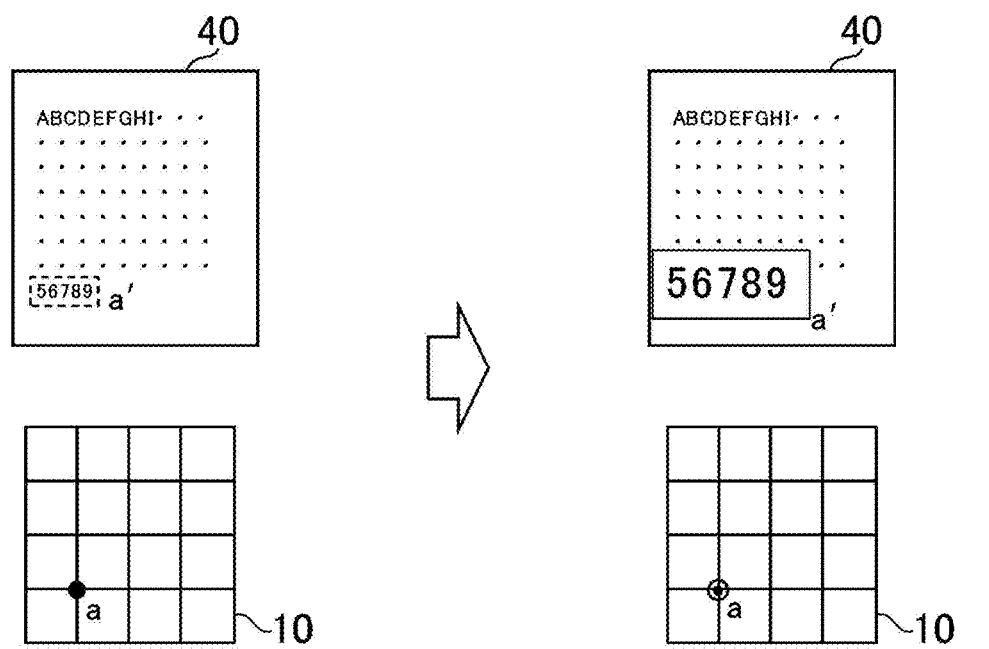
FIG. 16 is a diagram illustrating display examples of display objects displayed in the present embodiment.
Figure 16:
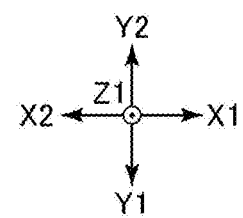
Figure 17:
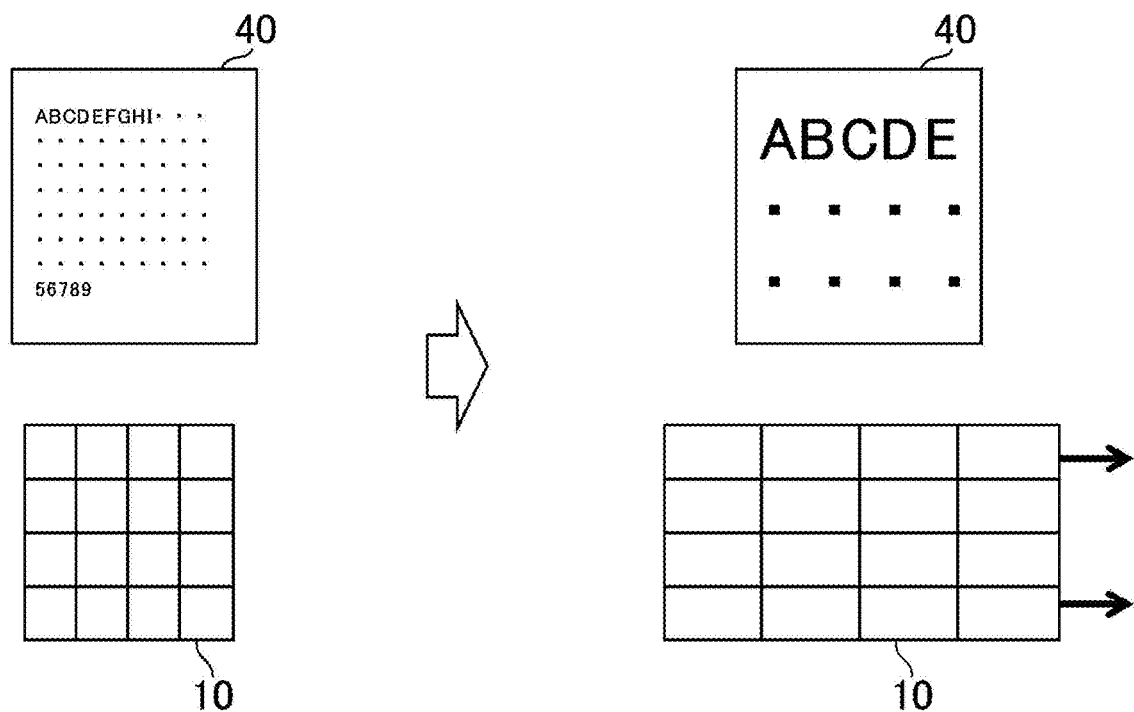
FIG. 17 is a diagram illustrating display examples of display objects displayed in the present embodiment.
Figure 17:
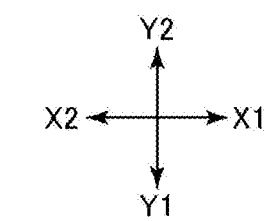

Next, other display examples of display objects in the display control system 100 according to the present embodiment will be described with reference to FIGS. 16 and 17. FIGS. 16 and 17 are diagrams illustrating display examples of display objects displayed in the present embodiment.

Similarly to FIG. 12, FIG. 16 schematically illustrates how the user operates the operating device 10, and also illustrates display objects that change according to the operation. In FIG. 17, a two-dimensional object including characters or images is illustrated as a display object displayed on the screen of the display device 40.

The portion of the two-dimensional object may be associated with any of the lattice points of the operating device 10 in advance. FIG. 16 illustrates an example in which a portion of the two-dimensional object that includes the text "56789" or an image is previously associated with lattice point a.

In FIG. 16, when the user performs the picking-up operation illustrated in FIG. 14, as the node mechanism section ND corresponding to lattice point a moves upward, the portion including the text "56789" or an image associated with lattice point a in advance is enlarged and displayed.

Similarly to FIG. 16, FIG. 17 illustrates an operation on the operating device 10 by the user and display objects that change according to the operation. In FIG. 17, as in FIG. 16, a two-dimensional object including characters or images is illustrated as a display object displayed on the screen of the display device 40.

FIG. 17 illustrates how a two-dimensional object is enlarged and displayed as the operating device 10 is spread out in the right-left direction.

Conclusion

In the operating device 10 according to the present embodiment described above, complex shape variation is possible through expansion, contraction, and bending. Therefore, the operating device 10 has a high degree of freedom in operation by the user. Furthermore, in the present embodiment, by displaying the display object on the basis of the position coordinates of respective lattice points of the operating device 10, which has a high degree of freedom in operation, the user's sense of touch can be used to intuitively control the movement of the display object. Further, in the present embodiment, various display modes can be expressed by changing the display object three-dimensionally based on the position coordinates of a plurality of lattice points.

In addition, in the operating device 10 according to the present embodiment, compared to operating devices including direction keys, operating sticks, etc., the operation of a complex three-dimensional object can be performed intuitively and easily by using the user's sense of touch.

Others

In the preset embodiment, in a case where the number of node mechanism sections ND arranged in the front-rear direction is n, and the number of node mechanism sections ND arranged in the right-left direction is m, an example in which n=5 and m=5 is described. However, the invention is not limited to this, and n and m may be integers of at least 3 or more. Further, n and m may be different numbers from each other.

Furthermore, the number of node mechanism sections ND included in the operating device 10 may be variable. For example, it may be possible to set n and m to 6 or more by allowing the node mechanism section ND including the holding part 13 that does not hold the link shaft SF to hold the link shaft SF, among the node mechanism sections ND illustrated in FIG. 2. For this purpose, the configuration itself is preferably common to all node mechanism sections ND regardless of the number of link shafts SF held thereby. Further, by making the configuration common to the node mechanism sections ND, manufacturing costs can be suppressed. Also, regarding the link shaft SF, the configuration itself is preferably common to all link shafts SF regardless of their arrangement and orientation.

Further, in the operating device 10 of the present embodiment, an example is illustrated in which the four mutually adjacent node mechanism sections ND and the four link shafts SF connecting these node sections form a rectangular lattice shape, but the invention is not limited to this, and any polygonal lattice may be used. For example, the node mechanism sections ND and the link shafts SF may be arranged to form a triangular lattice shape or a pentagonal lattice shape.

Further, the link shaft SF may be rotatable around a roll axis (chain line illustrated in FIG. 4) in a case where the V-axis illustrated in FIG. 4 is the yaw axis and the H-axis is the pitch axis. That is, the node mechanism section ND may hold the link shaft SF so as to allow rotation with the extending direction of the link shaft SF as the rotation axis. By adopting such a configuration, the degree of freedom in the posture of the operating device 10 can be further improved.

In the present embodiment, an example has been described in which the operating device 10 includes various sensors and acquires the position coordinates of the node mechanism section ND. However, the present invention is not limited to this, and the position coordinates of the node mechanism section ND may be acquired by using a camera or the like that captures the image of the operating device 10 from the outside. In this case, it is preferable to use a camera that can acquire three-dimensional position data.

As described above, the operating device 10 may be any device whose shape changes depending on the weight of the node mechanism section ND. To be specific, for example, one of a node mechanism section ND11 and a node mechanism section ND12 illustrated in FIG. 2 may hold the link shaft SF1 such that the extending direction of the held link shaft SF1 changes due to the other's own weight. Therefore, for example, in a state where the operating device 10 is placed on mounting surfaces having different levels, the operating device 10 preferably changes its shape to conform to the different levels.

Further, it is preferable for the operating device 10 not to have biasing means or the like for returning its shape to its original shape. That is, the operating device 10 preferably maintains its shape except for the case where the user performs an operation that changes its shape. For example, as illustrated on the right side of FIG. 17, when the user releases the operating device 10 while the display object is partially enlarged, it is preferable for the enlarged display state to be maintained.

The invention claimed is:

1. A display control system comprising:
circuitry configured to
control a display to display a display object including a plurality of elements respectively associated in advance with a plurality of lattice points included in a lattice-shaped operating device;
acquire position coordinates of each of the plurality of lattice points; and
determine a display mode of each of the plurality of elements based on the position coordinates of the plurality of lattice points respectively associated in advance with the plurality of elements,
wherein an outer shape of the display object and an outer shape formed by connecting the plurality of lattice points are dissimilar.

2. The display control system of claim 1, wherein
the display object is a three-dimensional object and each of the plurality of elements is a part of the three-dimensional object.

3. The display control system of claim 2, wherein
the part of the three-dimensional object is associated in advance with one of a plurality of control points.

4. The display control system of claim 3, wherein
the plurality of control points are respectively associated in advance with the plurality of lattice points.

5. The display control system of claim 4, wherein
the circuitry is configured to calculate position coordinates of each of the plurality of control points associated with the plurality of lattice points based on the position coordinates of each of the plurality of lattice points.

6. The display control system of claim 5, wherein
the circuitry is configured to control the display to display the three-dimensional object based on the position coordinates of the plurality of control points.

7. The display control system of claim 6, wherein
the three-dimensional object includes a first object with which a first control point is associated in advance, and a second object with which a second control point is associated in advance.

8. The display control system of claim 7, wherein
the circuitry is configured to integrate the first object and the second object so as to control the display to display a new object when an interval between position coordinates of the first control point and position coordinates of the second control point falls within a predetermined range.

9. The display control system of claim 8, wherein
one or more of the plurality of control points are newly associated with the new object.

10. The display control system of claim 1, wherein
the display object is a two-dimensional object including at least a character or an image.

11. The display control system of claim 10, wherein
each of the plurality of elements is a part of the two-dimensional object.

12. The display control system of claim 11, wherein
the part of the two-dimensional object is associated in advance with one of the plurality of lattice points.

13. The display control system of claim 12, wherein
the circuitry is configured to enlarge and control the display to display the part of the two-dimensional object based on position coordinates of the one of the lattice points that is associated in advance with the part of the two-dimensional object.

14. The display control system of claim 1, wherein
the operating device includes a plurality of link shafts.

15. The display control system of claim 14, wherein
the operating device includes a plurality of node mechanism sections forming a lattice shape together with the plurality of link shafts, each of the plurality of node mechanism sections holding one ends of at least two or more link shafts among the plurality of link shafts such that postures of the two or more link shafts are changeable.

16. The display control system of claim 15, wherein
each of the link shafts is capable of extending and contracting to vary a distance between the node mechanism sections adjacent to each other.

17. The display control system of claim 1, further comprising:
the operating device, the operating device including
a plurality of link shafts; and
a plurality of node mechanism sections forming a lattice shape together with the plurality of link shafts, each of the plurality of node mechanism sections holding one ends of at least two or more link shafts among the plurality of link shafts such that postures of the two or more link shafts are changeable, wherein
each of the link shafts is capable of extending and contracting to vary a distance between the node mechanism sections adjacent to each other.

18. A method for controlling display, the method comprising:
acquiring position coordinates of a plurality of lattice points included in a lattice-shaped operating device;
controlling a display to display a display object including a plurality of elements respectively associated in advance with the plurality of lattice points; and
determining a display mode of each of the plurality of elements based on the position coordinates of the plurality of lattice points that are respectively associated in advance with the plurality of elements,
wherein an outer shape of the display object and an outer shape formed by connecting the plurality of lattice points are dissimilar.

19. A non-transitory computer-readable medium including computer program instructions, which when executed by circuitry, cause the circuitry to:
acquire position coordinates of a plurality of lattice points included in a lattice-shaped operating device;
control a display to display a display object including a plurality of elements respectively associated in advance with the plurality of lattice points; and
determine a display mode of each of the plurality of elements based on the position coordinates of the plurality of lattice points that are respectively associated in advance with the plurality of elements,
wherein an outer shape of the display object and an outer shape formed by connecting the plurality of lattice points are dissimilar.

\* \* \* \* \*